(12) United States Patent
Stevens

(10) Patent No.: US 10,878,540 B1
(45) Date of Patent: Dec. 29, 2020

(54) CONTRAST RATIO DETECTION AND RENDERING SYSTEM

(71) Applicant: Electronic Arts Inc., Redwood City, CA (US)

(72) Inventor: Karen Elaine Stevens, Maitland, FL (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 15/677,859

(22) Filed: Aug. 15, 2017

(51) Int. Cl.
| | |
|---|---|
| *G06T 7/11* | (2017.01) |
| *G06T 11/40* | (2006.01) |
| *G06T 5/00* | (2006.01) |
| *G09G 3/36* | (2006.01) |

(52) U.S. Cl.
CPC .............. *G06T 5/008* (2013.01); *G06T 7/11* (2017.01); *G06T 11/40* (2013.01); *G09G 3/3607* (2013.01)

(58) Field of Classification Search
None
See application file for complete search history.

(56) References Cited

U.S. PATENT DOCUMENTS

| | | |
|---|---|---|
| 5,274,801 A | 12/1993 | Gordon |
| 5,548,798 A | 8/1996 | King |
| 5,982,389 A | 11/1999 | Guenter et al. |
| 5,999,195 A | 12/1999 | Santangeli |
| 6,064,808 A | 5/2000 | Kapur et al. |
| 6,088,040 A | 7/2000 | Oda et al. |
| 6,253,193 B1 | 6/2001 | Ginter et al. |
| 6,556,196 B1 | 4/2003 | Blanz et al. |
| 6,961,060 B1 | 11/2005 | Mochizuki et al. |
| 7,006,090 B2 | 2/2006 | Mittring |
| 7,403,202 B1 | 7/2008 | Nash |
| 7,415,152 B2 | 8/2008 | Jiang et al. |

(Continued)

FOREIGN PATENT DOCUMENTS

| | | |
|---|---|---|
| CN | 102509272 A | 6/2012 |
| CN | 103546736 A | 1/2014 |

(Continued)

OTHER PUBLICATIONS

Anagnostopoulos et al., "Intelligent modification for the daltonization process", International Conference on Computer Vision Published in 2007 by Applied Computer Science Group of digitized paintings.

(Continued)

*Primary Examiner* — Aaron M Richer
(74) *Attorney, Agent, or Firm* — Knobbe, Martens, Olson & Bear, LLP

(57) ABSTRACT

Systems and methods can automatically detect bad contrast ratios in a rendered frame of a game application. A frame in the game application can be divided into a plurality of pixel regions with each pixel regions having multiple pixels. The systems and methods can calculate luminance of the pixels in the pixel region and calculate a contrast ratio for the pixel region based on the luminance of the pixels in the pixel region. The contrast ratio of the pixel region can be used to determine whether it is sufficient to meet a threshold contrast ratio. The color of the pixel region can be automatically changed to a predefined color to indicate that contrast ratio is sufficient to meet the threshold contrast ratio.

20 Claims, 8 Drawing Sheets

(56) References Cited

U.S. PATENT DOCUMENTS

| | | | |
|---|---|---|---|
| 8,100,770 B2 | 1/2012 | Yamazaki et al. | |
| 8,142,282 B2 | 3/2012 | Canessa et al. | |
| 8,154,544 B1 | 4/2012 | Cameron et al. | |
| 8,207,971 B1 | 6/2012 | Koperwas et al. | |
| 8,267,764 B1 | 9/2012 | Aoki et al. | |
| 8,281,281 B1 | 10/2012 | Smyrl et al. | |
| 8,395,626 B2 | 3/2013 | Millman | |
| 8,398,476 B1 | 3/2013 | Sidhu et al. | |
| 8,406,528 B1* | 3/2013 | Hatwich | G06T 7/13 |
| | | | 382/164 |
| 8,540,560 B2 | 9/2013 | Crowley et al. | |
| 8,599,206 B2 | 12/2013 | Hodgins et al. | |
| 8,624,904 B1 | 1/2014 | Koperwas et al. | |
| 8,860,732 B2 | 10/2014 | Popovic et al. | |
| 8,914,251 B2 | 12/2014 | Ohta | |
| 9,117,134 B1 | 8/2015 | Geiss et al. | |
| 9,256,973 B2 | 2/2016 | Koperwas et al. | |
| 9,317,954 B2 | 4/2016 | Li et al. | |
| 9,483,860 B2 | 11/2016 | Hwang et al. | |
| 9,616,329 B2 | 4/2017 | Szufnara et al. | |
| 9,741,146 B1 | 8/2017 | Nishimura | |
| 9,811,716 B2 | 11/2017 | Kim et al. | |
| 9,826,898 B1 | 11/2017 | Jin et al. | |
| 9,984,658 B2 | 5/2018 | Bonnier et al. | |
| 9,990,754 B1 | 6/2018 | Waterson et al. | |
| 10,022,628 B1 | 7/2018 | Matsumiya et al. | |
| 10,096,133 B1 | 10/2018 | Andreev | |
| 10,118,097 B2 | 11/2018 | Stevens | |
| 10,198,845 B1 | 2/2019 | Bhat et al. | |
| 10,388,053 B1 | 8/2019 | Carter, Jr. et al. | |
| 10,403,018 B1 | 9/2019 | Worsham | |
| 10,535,174 B1 | 1/2020 | Rigiroli et al. | |
| 10,726,611 B1 | 7/2020 | Court | |
| 10,733,765 B2 | 8/2020 | Andreev | |
| 2002/0054054 A1* | 5/2002 | Sanbe | G06F 9/451 |
| | | | 715/700 |
| 2002/0180739 A1 | 12/2002 | Reynolds et al. | |
| 2003/0038818 A1* | 2/2003 | Tidwell | G06T 5/20 |
| | | | 345/611 |
| 2004/0227760 A1 | 11/2004 | Anderson et al. | |
| 2004/0227761 A1 | 11/2004 | Anderson et al. | |
| 2005/0237550 A1 | 10/2005 | Hu | |
| 2006/0036514 A1 | 2/2006 | Steelberg et al. | |
| 2006/0149516 A1 | 7/2006 | Bond et al. | |
| 2006/0262114 A1 | 11/2006 | Leprevost | |
| 2007/0085851 A1 | 4/2007 | Muller et al. | |
| 2007/0097125 A1 | 5/2007 | Xie et al. | |
| 2008/0049015 A1 | 2/2008 | Elmieh et al. | |
| 2008/0111831 A1* | 5/2008 | Son | G06T 3/4038 |
| | | | 345/629 |
| 2008/0152218 A1 | 6/2008 | Okada | |
| 2008/0268961 A1 | 10/2008 | Brook | |
| 2008/0316202 A1 | 12/2008 | Zhou et al. | |
| 2009/0066700 A1 | 3/2009 | Harding et al. | |
| 2009/0315839 A1 | 12/2009 | Wilson et al. | |
| 2010/0134501 A1 | 6/2010 | Lowe et al. | |
| 2010/0251185 A1 | 9/2010 | Pattenden | |
| 2010/0277497 A1* | 11/2010 | Dong | G06T 11/001 |
| | | | 345/589 |
| 2011/0012903 A1 | 1/2011 | Girard | |
| 2011/0074807 A1* | 3/2011 | Inada | G06T 11/001 |
| | | | 345/589 |
| 2011/0086702 A1 | 4/2011 | Borst et al. | |
| 2011/0119332 A1 | 5/2011 | Marshall et al. | |
| 2011/0128292 A1 | 6/2011 | Ghyme et al. | |
| 2011/0164831 A1 | 7/2011 | Van Reeth et al. | |
| 2011/0187731 A1* | 8/2011 | Tsuchida | H04N 21/4318 |
| | | | 345/581 |
| 2011/0269540 A1 | 11/2011 | Gillo et al. | |
| 2011/0292055 A1 | 12/2011 | Hodgins et al. | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0244941 A1 | 9/2012 | Ostergren et al. | |
| 2012/0303343 A1 | 11/2012 | Sugiyama et al. | |
| 2012/0313931 A1 | 12/2012 | Matsuike et al. | |
| 2013/0050464 A1* | 2/2013 | Kang | G02B 21/26 |
| | | | 348/79 |
| 2013/0063555 A1 | 3/2013 | Matsumoto et al. | |
| 2013/0120439 A1 | 5/2013 | Harris et al. | |
| 2013/0121618 A1 | 5/2013 | Yadav | |
| 2013/0222433 A1 | 8/2013 | Chapman et al. | |
| 2013/0235045 A1 | 9/2013 | Corazza et al. | |
| 2013/0263027 A1 | 10/2013 | Petschnigg et al. | |
| 2013/0311885 A1* | 11/2013 | Wang | G06F 3/04845 |
| | | | 715/719 |
| 2014/0002463 A1 | 1/2014 | Kautzman et al. | |
| 2014/0198106 A1 | 7/2014 | Sumner et al. | |
| 2014/0198107 A1 | 7/2014 | Thomaszewski et al. | |
| 2014/0327694 A1* | 11/2014 | Cao | H04N 13/0422 |
| | | | 345/597 |
| 2015/0113370 A1 | 4/2015 | Flider | |
| 2015/0126277 A1 | 5/2015 | Aoyagi | |
| 2015/0187113 A1 | 7/2015 | Rubin et al. | |
| 2015/0235351 A1 | 8/2015 | Mirbach et al. | |
| 2015/0243326 A1 | 8/2015 | Pacurariu et al. | |
| 2015/0381925 A1 | 12/2015 | Varanasi et al. | |
| 2016/0026926 A1 | 1/2016 | Yeung et al. | |
| 2016/0071470 A1 | 3/2016 | Kim et al. | |
| 2016/0217723 A1 | 7/2016 | Kim et al. | |
| 2016/0307369 A1 | 10/2016 | Freedman et al. | |
| 2016/0314617 A1 | 10/2016 | Forster et al. | |
| 2016/0354693 A1 | 12/2016 | Yan et al. | |
| 2017/0301310 A1 | 10/2017 | Bonnier et al. | |
| 2017/0301316 A1 | 10/2017 | Farell | |
| 2018/0043257 A1 | 2/2018 | Stevens | |
| 2018/0122125 A1 | 5/2018 | Brewster | |
| 2018/0211102 A1 | 7/2018 | Alsmadi | |
| 2019/0139264 A1 | 5/2019 | Andreev | |

FOREIGN PATENT DOCUMENTS

| | | |
|---|---|---|
| CN | 105405380 A | 3/2016 |
| CN | 105825778 A | 8/2016 |

OTHER PUBLICATIONS

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

(56) References Cited

OTHER PUBLICATIONS

Dudash, Bryan. "Skinned instancing." NVidia white paper(2007).
Fikkan, Eirik. Incremental loading of terrain textures. MS thesis. Institutt for datateknikk og informasjonsvitenskap, 2013.
Geijtenbeek, T. et al., "Interactive Character Animation using Simulated Physics", Games and Virtual Worlds, Utrecht University, The Netherlands, The Eurographics Association 2011, 23 pgs.
Georgii et al., "Corotated Finite Elements Made Fast and Stable", Workshop in Virtual Reality Interaction and Physical Simulation VRIPHYS (2008), 9 pgs.
Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.
Han et al., "On-line Real-time Physics-based Predictive Motion Control with Balance Recovery," Eurographics, vol. 33(2), 2014, 10 pages.
Hernandez, Benjamin, et al. "Simulating and visualizing real-time crowds on GPU clusters." Computación y Sistemas 18.4 (2014): 651-664.
Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.
Hu Gousheng, Face Analysis using 3D Morphable Models, Ph.D. Thesis, University of Surrey, Apr. 2015, pp. 1-112.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Klein, Joseph. Rendering Textures Up Close in a 3D Environment Using Adaptive Micro-Texturing. Diss. Mills College, 2012.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs, obtained Mar. 20, 2015.
Levine, S. et al., "Continuous Character Control with Low-Dimensional Embeddings", Stanford University, University of Washington, 10 pgs, obtained Mar. 20, 2015.
Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
McDonnell, Rachel, et al. "Clone attack! perception of crowd variety." ACM Transactions on Graphics (TOG). vol. 27. No. 3. ACM, 2008.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.

Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse, Soraia Raupp, and Daniel Thalmann. "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.
Rungjirataranon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Seo et al., "Compression and Direct Manipulation of Complex Blendshape Models", Dec. 2011, in 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Treuille, A. et al., "Near-optimal Character Animation with Continuous Control", University of Washington, 2007, 7 pgs.
Ulicny, Branislav, and Daniel Thalmann. "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n °4). pp. 1-11. ISSN 0730-0301, 12 pgs.
Vigueras, Guillermo, et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.

\* cited by examiner

CONTRAST RATIO DETECTION AND RENDERING SYSTEM

BACKGROUND

Contrast ratio is a property of visual content. A high contrast ratio represents a better color representation (e.g., against a darker background) than a lower contrast ratio. People with colorblindness (also known as color vision deficiency) have decreased ability to perceive and differentiate colors. With an increasing number of people interested in playing video games, a variety of accessibility guidelines have been developed to ensure that people with colorblindness are able to benefit from the video games. The guidelines can include contrast ratio standards. Colorblind gamers may have difficulties distinguishing various in-game objects, text; icons, or the like if a video game fails to meet contrast ratio standards for colorblind accessibility.

SUMMARY OF EMBODIMENTS

The systems, methods, and devices of this disclosure each have several innovative aspects, no single one of which is solely responsible for the all of the desirable attributes disclosed herein.

A system comprising: at least one hardware processor configured to render graphics of a game application, wherein the graphics comprise a plurality of frames, wherein the computer-readable instructions causes the at least one hardware processor to: identify a frame among the plurality of frames rendered during runtime of the game application; determine a pixel region in the frame, wherein the pixel region comprises a plurality of pixels; calculate a luminance for two or more pixels of the plurality of pixels in the pixel region; select a highest luminance value associated with a first pixel in the pixel region and a lowest luminance value associated with a second pixel in the pixel region; calculate a contrast ratio for the pixel region using the highest luminance value and the lowest luminance value; determine whether the contrast ratio meets a threshold contrast ratio; provide a visual indication in the pixel region in response to a determination that the pixel region meets the threshold contrast ratio; generate an updated frame comprising the visual indication based on the frame; and output the updated frame for display in the game application.

A computer-implemented method for automatically detecting a contrast ratio in a rendered frame, the computer-implemented method comprising: identifying a frame among a plurality of frames rendered during runtime of the game application; determining a pixel region in the frame, wherein the pixel region comprises a plurality of pixels; calculating a luminance for two or more pixels of the plurality of pixels in the pixel region; selecting a highest luminance value associated with a first pixel in the pixel region and a lowest luminance value associated with a second pixel in the pixel region; calculating a contrast ratio for the pixel region using the highest luminance value and the lowest luminance value; determining whether the contrast ratio meets a threshold contrast ratio; providing a visual indication in the pixel region in response to a determination that the pixel region meets the threshold contrast ratio; generating an updated frame comprising the visual indication based on the frame; and outputting the updated frame for display in the game application.

A non-transitory computer readable medium storing software instructions thereon for automatically detecting a contrast ratio in a rendered frame, the software instructions cause a computer system to: identify a frame among a plurality of frames rendered during runtime of a game application; determine a pixel region in the frame; wherein the pixel region comprises a plurality of pixels; calculate a luminance for two or more pixels of the plurality of pixels in the pixel region; select a highest luminance value associated with a first pixel in the pixel region and a lowest luminance value associated with a second pixel in the pixel region; calculate a contrast ratio for the pixel region using the highest luminance value and the lowest luminance value; determine whether the contrast ratio meets a threshold contrast ratio; provide a visual indication in the pixel region in response to a determination that the pixel region meets the threshold contrast ratio; generate an updated frame comprising the visual indication based on the frame; and output the updated frame for display in the game application.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Video games that fail to meet contrast ratio standards for colorblind accessibility can make it difficult for colorblind gamers to distinguish various elements in a game application, such as game objects, text, icons, and the like. Game developers can make games more colorblind accessible by making sure that the game graphics have high enough contrast ratios between elements within the game, such as the game background and the text in the game or between two adjacent graphical elements. However, there does not exist a good way for game developers to efficiently test whether the graphics meet contrast ratio standards. A game developer can analyze individual rendered frames by manually determining contrast ratios between the elements within the frame. For example, an eye dropper tool could by used to identify the colors for individual pixels and then calculate the contrast ratios for the selected pixels. However, a single image contains thousands of pixels and video games usually generate and render frames at 30 frames per second or higher. A game developer may need to perform the same process thousands of times in order to determine which regions in an image meet or do not meet the defined contrast ratios for colorblindness accessibility.

To solve this problem, the disclosure describes a tool which can automatically detect contrast ratios in a rendered frame of a game application. The tool can include a contrast ratio processing system which can be executed during the post processing stage of a game application or be used in a game editor. The tool can divide a frame in the game application into a plurality of pixel regions with each pixel region including multiple pixels. The tool can calculate the luminance for the pixels in the pixel region. The tool can further select a pixel with the highest luminance value and select another pixel with the lowest luminance value in the pixel region. The tool can then calculate a contrast ratio for the pixel region using the highest luminance and the lowest luminance and determine whether the contrast ratio meets a defined contrast ratio threshold. The tool can automatically change the color of the pixel region to a predefined color to indicate that the pixel region satisfies the contrast ratio threshold.

Although various examples regarding the tool may be described with reference to improving colorblind accessibility, the tool is not limited to the context of colorblind accessibility. For example, the techniques described herein are also applicable for detecting contrast ratio in the context of low vision or normal vision.

Example Computing Environment for a Contrast Ratio Processing System

Figure 1:
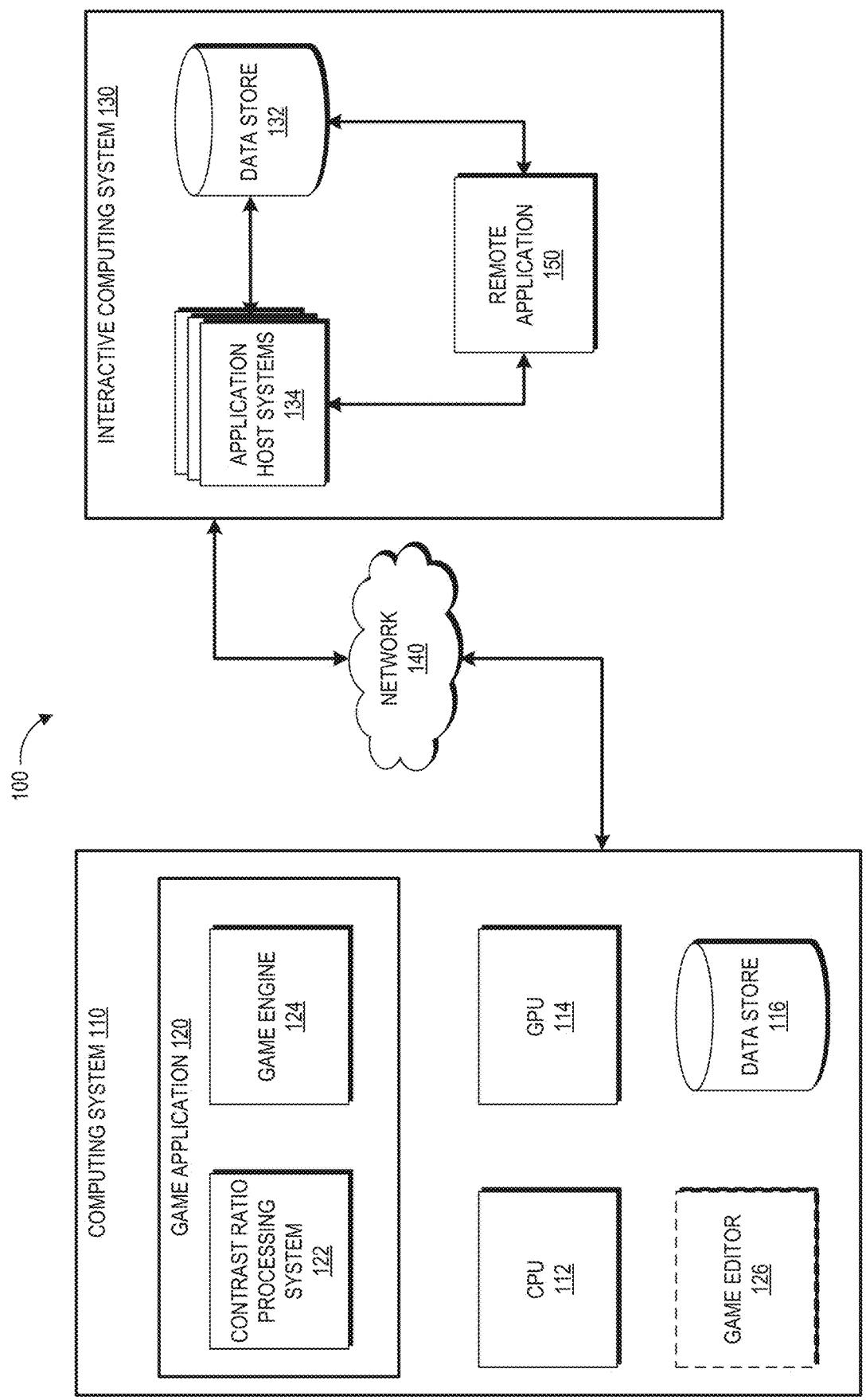
FIG. 1 illustrates an example computing environment of a contrast ratio processing system.

FIG. 1 illustrates an embodiment of a computing environment for implementing one or more embodiments of a contrast ratio processing system. The computing environment 100 can include a computing system 110 and an interactive computing system 130. The computing system 110 can execute a game application 120 which can host a game engine 124 and allow a player to play the game application 120. The game application 120 can also include a contrast ratio processing system 122 which can detect contrast ratio of images during execution of the game application 120.

The computing system 110 can communicate with the interactive computing system 130 via the network 140. The interactive computing system 130 can include a remote application 150 which can facilitate the execution of the game application 120 or provide one or more server side developer tools, a data store 132 configured to store information (such as graphics and computer code) associated with the game application 120 or the remote application 150, and application host systems which are configured to host at least a portion of the game application 120. To simplify discussion and not to limit the present disclosure, FIG. 1 illustrates one computing system 110 and one interactive computing system 130, though multiple systems may be used.

Computing System

The computing system 110 can include a central processing unit (CPU) 112, a graphics processing unit (GPU) 114, a data store 116, and optionally a game editor 126. The computing system 110 may be implemented on a computing device such as the computing device 10 illustrated in FIG. 7. The computing system 110 may be in communication with the interactive computing system 130. For example, the interactive computing system 130 can communicate updates of the game application 120 to the computing system 110. The computing system 110 may use the CPU 112, the GPU 114, and the data store 116 to execute a game application 120. The game application 120 may be part of a game engine 118 which can include instructions causing the CPU 112 and/or the GPU 114 to execute at least a portion of the game application 120. The game application 120 can also include the contrast ratio processing system 122. The contrast ratio processing system 122 can be integrated into the game application (e.g., such as a debug tool) and detect contrast ratio of game images in the game application 120. The contrast ratio processing system 122 can also be a stand-alone application in certain embodiments.

The computing system 110 may include hardware and software components for establishing communications over a communication network 140. For example, the computing system 110 may be equipped with networking equipment and network software applications (for example, a web browser) that facilitates communications via one or more networks (for example, the Internet or an intranet).

Game Application

The computing system 110 may execute a game application 120. The game application 120 may be an offline game which can be run locally on the computing system 110. The game application 120 may also be an online game which can involve communications among multiple computing systems. The computing system 110 can execute a game application 120 that may be stored and/or executed in a distributed environment. For example, the computing system 110 may execute a portion of a game and the interactive computing system 130, or an application host system 134 of the interactive computing system 120 may execute another portion of the game. For instance, the game may be a massively multiplayer online role-playing game (MMORPG) that includes a client portion executed by the computing system 110 and a server portion executed by one or more application host systems 134. For the present discussion, the game application 120 can include a distributed application or an application that includes a portion that executes on the computing system 110 and a portion that executes on at least one of the application host systems 134. Detailed elements of the game application 120 are further described with reference to the game system 200 in FIG. 2.

Game Engine

The game application 120 can include a game engine 124. The game engine 124 can be an embodiment of the game engine 202 or implement one or more portions (in addition or in alternative to the game engine 202) of the game system 200 (shown in FIG. 2), The game engine 124 can be loaded into the memory on the computing system 110 and can act as an interface or hub for one or more game applications 120 that interfaces with the application host systems 134.

The game engine 124 can be configured to execute aspects of the operation of the game application 120 according to game rules. Examples of game rules can include rules for scoring, possible inputs, actions/events, movement in response to inputs, and the like. Other components can control what inputs are accepted and how the game progresses, and other aspects of gameplay. The game engine 124 can receive the user inputs and determine in-game events, such as actions, jumps, runs, throws, attacks, and other events appropriate for the game application 120. During runtime operation, the game engine 124 can read user inputs, in-game data, and game state information to determine the appropriate in-game events. Additional examples of the game engine are further described in FIG. 2.

Contrast Ratio Processing System

The game application 120 can also include a contrast ratio processing system 122. In some embodiments, the contrast ratio processing system 122 can be integrated into the game application 120 or the game engine 124 as a debug tool. A user of the game application 120 can turn on/off the contrast ratio processing system 122 while the game application 120 is executing.

The contrast ratio processing system 122 can divide a frame rendered by the game application 120 into a plurality of pixel regions. The contrast ratio processing system 122 can calculate luminance of pixels in the plurality of pixel regions and use the luminance of the pixels to calculate a contrast ratio for the pixel region. The contrast ratio processing system 122 can also determine a threshold contrast ratio which may be a contrast ratio that is sufficient for colorblind accessibility. In some embodiments, the threshold contrast ratio may be defined by a user. The threshold contrast ratio or the value of the contrast ratio may depend on characteristics of game application. For example, a larger text may require a lower contrast ratio because the larger text can be perceived more easily by people with colorblindness or low vision. The light settings in the game can also have an effect on the contrast ratio. For example, a game scene illustrating a dark and stormy night may require a higher contrast ratio to be colorblind accessible than a scene which shows a bright sunny day, because it can be more difficult to perceive objects in a dark environment. As another example, a game application's light settings can determine how the contrast ratio is calculated. For example, frames rendered by high-dynamic-range (HDR) technique may require special handling when calculating the contrast ratio. The contrast ratio processing system 122 can compare a contrast ratio calculated for a pixel region with the threshold contrast ratio. If the calculated contrast ratio exceeds the threshold contrast ratio, the contrast ratio processing system 122 can change the color of the pixel region to show that the threshold contrast ratio has been met for the pixel region.

Although in FIG. 1, the contrast ratio processing system 122 is illustrated as part of the game application 120, in some embodiments, the contrast ratio processing system 122 may be a standalone application which is outside of the game application 120. As another example, the contrast ratio processing system 122 may be part of the game editor 126, where the contrast ratio processing system 122 can calculate contrast ratios for graphics (and frames) that are being configured by the game developers in the game editor 126. In certain implementations, not all components of the contrast ratio processing system 122 are located at the same place. For example, some components of the contrast ratio processing system 122 may be located at the computing system 110 while other components may be located at the interactive computing system 130 as part of the remote application 150.

Central Processing Unit and Graphics Processing Unit

The CPU 112 and GPU 114 of the computing system 110 can execute instructions to execute the game application 120. The CPU 112 or GPU 114 can be configured to render the graphics within the game application 120. The GPU 114 can be a dedicated processing unit for rendering graphics within the computing system. The GPU 114 may process the multiple batches in parallel and thereby reduce the time needed to render game graphics.

Game Editor

The game editor 126 can be used to configure in-game graphics as well as various rules in the game. For example, the game editor 126 can configure appearances of in-game characters such as the color or patterns of the characters' shirts. In some embodiments, the contrast ratio processing system 122 may be part of the game editor 126. For example, the contrast ratio processing system 122 can detect whether the contrast ratio between a character in the game editor and the background meets a threshold contrast ratio.

Data Store

The computing system 110 can include a data store 116. The data store 116 can be configured to store data that may be generated or used by the computing system 110. For example, the data store 116 may store instructions for executing the game application 120 and the contrast ratio processing system 122.

Interactive Computing System

The interactive computing system 130 may include a remote application 150, application host systems 134, and a data store 132. The interactive computing system 130 may be part of the computing device 10 in FIG. 7. A game developer may use the interactive computing system 130 to customize various features of the game application 120.

Application Host Systems

As described with reference to the computing system 110, the application host systems 134 can host at least a portion of the game application 120. The application host systems 134 can be configured to execute a portion of the game application 120 and/or game engine 124. In certain embodiments, instead of or in addition to executing a portion of the game application 120 and/or game engine 124, the application host systems 122 may execute another application, which may complement and/or interact with the game application 120 during the execution of an instance of the game application 120.

The interactive computing system 130 may enable multiple players or computing systems to access a portion of the game application 120 and/or game engine 124 executed or hosted by the interactive computing system 130. In some embodiments, the portion of the game application 120 executed by application host systems 134 of the interactive computing system 130 may create a persistent virtual world. This persistent virtual world may enable one or more players to interact with the virtual world and with each other in a synchronous and/or asynchronous manner. In some embodiments, the application host systems 134 may execute a hosting system for executing various aspects of a game environment. For example, in one embodiment, the game application 120 may be a competitive game, such as a first person shooter or sports game, and the application host systems 134 can provide a dedicated hosting service for hosting multiplayer game instances or facilitate the creation of game instances hosted by player computing devices. In some embodiments, the application host systems 134 can provide a lobby or other environment for players to virtually interact with one another. Such environments may include environments for conducting transactions between players, such as an auction house or type of environment for facilitating transactions.

Remote Application

The remote application 150 can facilitate the execution of the game application 120 or include one or more tools for analyzing the game application 120. For example, the remote application 150 may include a telemetry analysis system which can acquire game application's 120 data and perform game metric analysis based on the acquired data. In some embodiments, the remote application 150 can include the game editor 126 for editing environments and objects in the game application 120. Although the contrast ratio processing system 122 is illustrated to be part of the game application 120, in some embodiments, the contrast ratio processing system can be part of the remote application 150. For example, the computing system 110 can acquire an image of a scene in the game application 120 and communicate the image via the network 140 to the remote application 150. The remote application 150 can calculate contrast ratios for various pixel regions in the image and determine whether one or more pixel regions meet the defined contrast ratio. If the contrast ratio requirement is met for a pixel region, the remote application 150 may send an instruction to the game application 120 which can change the color of the pixel region to a predefined color. In some implementations, the remote application 150 may send the contrast ratios to the game application 120 which can determine whether to change the color of the pixel region by determining whether the contrast ratio (as calculated by the remote application 150) has met the requirement.

Data Store

The data store 132 can store information associated with the game application, such as a virtual environment of the game application 120, game rules, as well as assets in the game application 120, such as graphical appearances and animations of game characters.

Examples of a Game System

Figure 2:
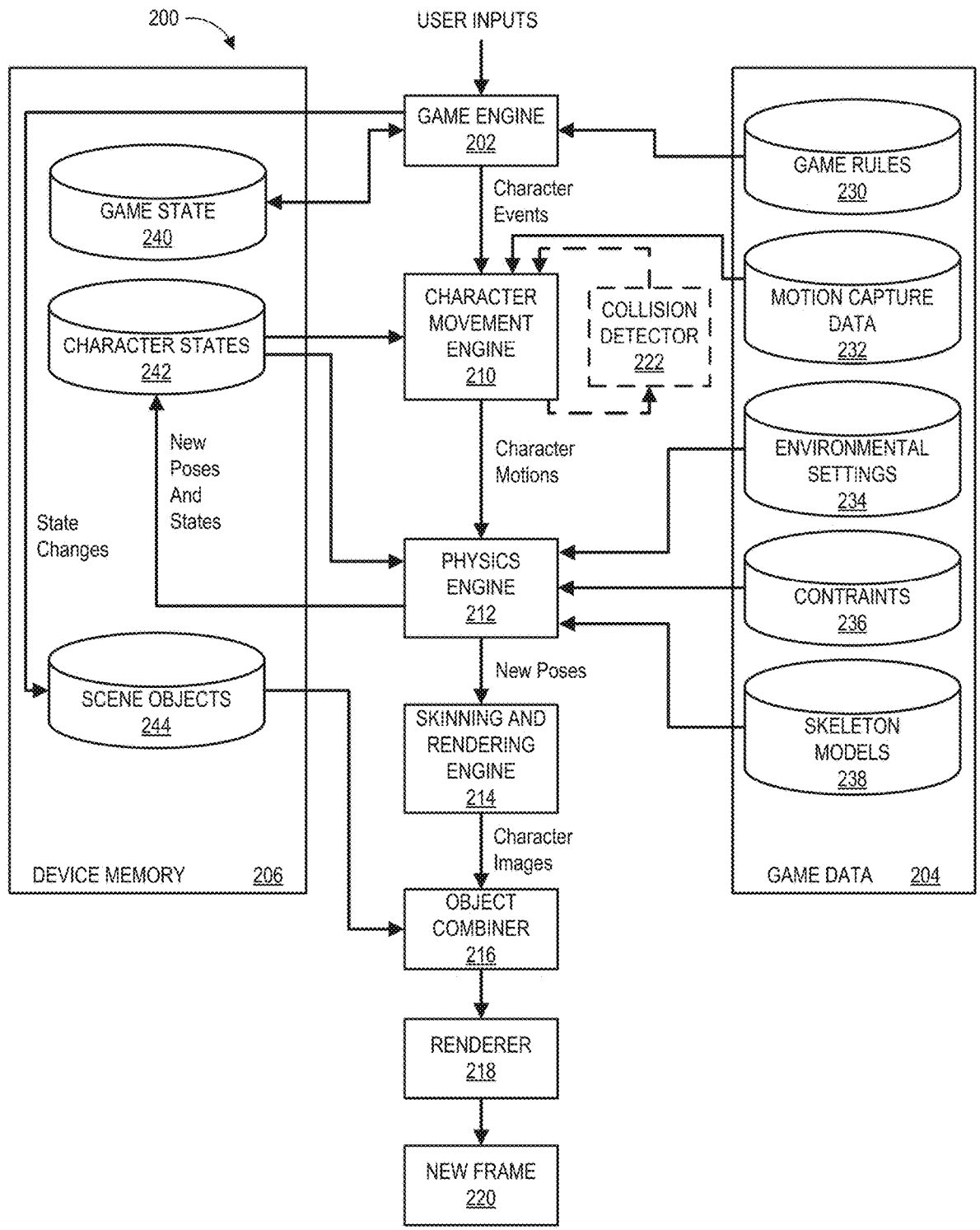
FIG. 2 illustrates an embodiment of elements of a game system involved in execution of gameplay within a game application.

FIG. 2 illustrates an embodiment of elements of a game system 200 involved in execution of gameplay within a game application. The game system 200 can be part of the game application 120. The game system 200 can include device memory 206, and various engines such as the game engine 202, the character movement engine 210, the physics engine 212, the skinning and rendering engine 214, the object combiner 216, the renderer 218, and so on. The device memory 206 may be an example of the data store 116. In some implementations, the game data 204 may also be stored in the data store 116. The game engine 202 of the game system 200 may be an example of the game engine 124 shown in FIG. 1. In some embodiments, the game engine 124 can also include other engines (such as, for example, the character movement engine 210, the physics engine 212, or) the skinning and rendering engine 214) alone or in combination with the game engine 202.

A computing device can provide for user input to control aspects of the game according to game rules 230. Game rules 230 might be specified in instruction form on game media 12 (shown in FIG. 7). Examples of game rules 230 include rules for scoring, possible inputs, actions/events, movement in response to inputs, and the like. Other components can control what inputs are accepted and how the game progresses, and other aspects of gameplay. The elements in FIG. 2 illustrate elements used for generating and rendering animation within the game based on various inputs.

As shown in FIG. 2, by system 200, user inputs and game code/data may be used to generate display video. The game system also handles playing the game and presenting corresponding audio output. The description of FIG. 2 is focused on generating frames of display video for the game. A game engine 202 receives the user inputs and determines character events, such as actions, collisions, runs, throws, attacks and other events appropriate for the game.

The character events are conveyed to a character movement engine 210 that determines the appropriate motions the characters should make in response to the events and passes those motions on to a physics engine 212. The physics engine 212 determines new poses for the characters and provides those new poses to a skinning and rendering engine 214. Engine 214 in turn provides character images to an object combiner 216 to combine animate, inanimate and background objects into a full scene. The full scene is conveyed to a renderer 218, which generates a new frame 220 therefrom.

Game data 204 is shown comprising game rules 230, prerecorded motion capture data 232 (such as poses or paths), environmental settings 234, constraints 236 (such as strength and velocity constraints), and skeleton models 238. The device executing the game might have memory 206 for game state 240, character states 242 and scene object storage 244. Character states 242 can comprise storage for a current pose of characters being animated.

During operation, the game engine 202 reads in game rules 230 and considers game state 240 to arrive at character events. The character movement engine 210 reads in prerecorded motion capture data 232 (for example, poses/paths) as well as character states 242. An optional collision detector engine can perform a process that can derive the desired motions for characters based on collisions. Motions might be expressed as a set of external forces, target poses and the like. As needed, the character movement engine 210 may also use other data elements shown, such as skeleton models 238, also referred to as rigs. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. The character movement engine 210 might also introduce character movements for randomness, personality, and so forth.

The physics engine 212 inputs the skeleton models of various characters, environmental settings 234, character states such as current poses (for example, positions of body parts expressed as positions, joint angles or other specifications), and velocities (linear and/or angular) of body parts and motions provided by character movement engine 210, which can be in the form of a set of force/torque vectors for some or all body parts. From this information, physics engine 212 generates new poses for the characters using rules of physics and those new poses can be used to update character states 242 and are also provided to the skinning and rendering engine 214. Where invisible skeleton models are used, character states 242 might contain current position of visible "graphics" of characters as well as the invisible rag-doll skeleton characters.

The skinning and rendering engine 214 takes into account the surfaces, colors, and textures of the body parts of posed characters and renders character images. The object combiner 216 can then combine the character images with inanimate and background objects obtained from scene objects store 214 to provide a complete scene to renderer 218. The renderer 218 then generates a new frame 220. This process can be repeated for each frame rendered during runtime execution of the game application. Generally, a game application renders frames at 30 frames per second or more.

Examples of a Contrast Ratio Processing System

Figure 3:
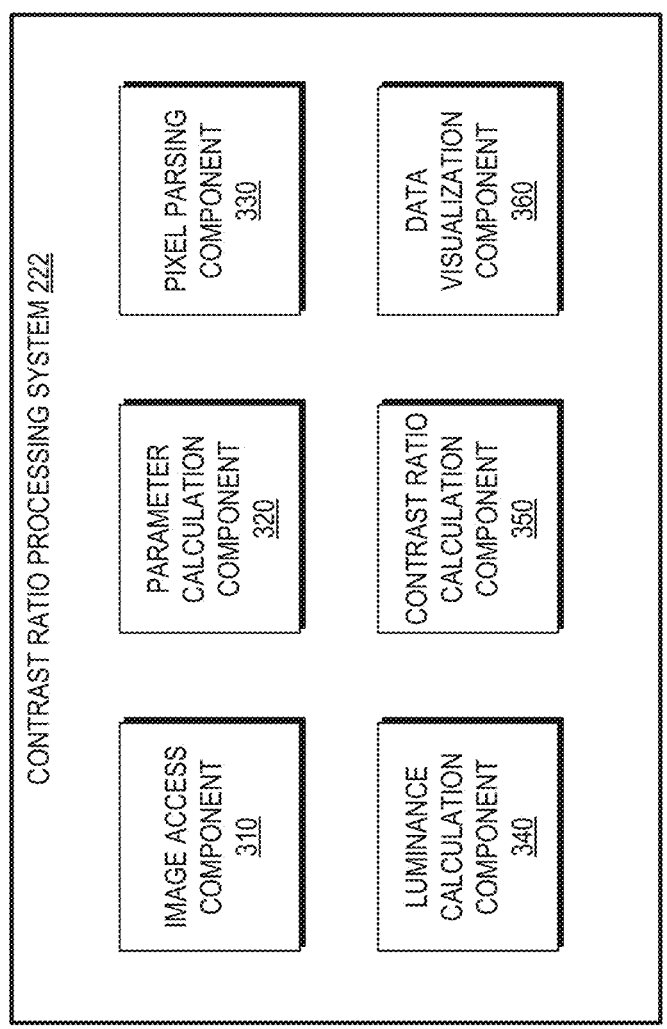
FIG. 3 illustrates an example of a contrast ratio processing system.

FIG. 3 illustrates an example of a contrast ratio processing system. The contrast ratio processing system 122 can include an image access component 310, a parameter calculation component 320, a pixel parsing component 330, a luminance calculation component 340, a contrast ratio calculation component 350, and a data visualization component 360. These example components are for illustrative purposes only. In various embodiments, the contrast ratio processing system 122 can include more or fewer components and one or more of the components may be combined into a single component. For example, the parameter calculation component 320 may be optional. As another example, the image access component 310 may be combined with the pixel parsing component 330.

The image access component 310 can be configured to acquire a frame in the game application 120. The image access component 310 may be a plug-in application to the game application 120. The image access component 310 can acquire the frame from the graphics rendered by the game application 120. As an example, the image access component 310 can acquire the image as part of the post-processing of the game rendering. During the post-processing, the scene is first rendered to a buffer of the GPU 114 before being rendered on the display. The image access component 310 can accordingly acquire a frame of the scene before it is rendered to the display. As another example of acquiring the frame, the image access component 310 can take a screen shot of the game application 120 as rendered on the display.

In some embodiments, the game application 120 can include continuous motions, e.g., when a player moves from the left side of a tennis court to the right side of the tennis court, the image access component 310 can keep track of the frames involved in such motions.

The frame acquired by the image access component 310 can have a defined resolution of a plurality of pixels. The pixel parsing component 330 can identify the pixels in the image and group the pixels into a plurality of pixel regions. A pixel region can have a size and a shape. For example, a pixel region can consist of four neighboring pixels forming a square shape. The pixel region can also have other shapes such as rectangle, oval, circle, x-shape, irregular, and so on. The size of a pixel region can determine how many pixels are in the pixel region. As will further described with reference to data visualization component 360, a smaller size can result in a smoother line which connect the pixels regions that meet the contrast ratio requirement while a larger size can result in a rougher line. In some embodiments, video or image jittering can occur, where the horizontal lines of video image frames are randomly displaced due to the corruption of synchronization signals or electromagnetic interference during the graphics transmission. The size of the pixel region may be modified to accommodate jittering. For example, the size of the pixel region can increase to include some neighboring pixels to account for jittering. In addition to or in alternative to increasing the size of the pixel region, in certain implementations, when delineating the boundaries of pixel regions, the pixel parsing component 330 can skip a couple of pixels to take into account the jittering. For example, the pixel parsing component 330 can exclude a few pixels in-between a pixel region and its neighboring pixel region. As a result, these excluded pixels may not be in the pixel regions for which contrast ratio are calculated. The size and shape can be determined by the parameter calculation component 320. For example, the parameter calculation component 320 can include a user interface component. The parameter calculation component 320 can present a set of available shapes or sizes on the user interface. A user (such as, for example, a game developer) can accordingly select a shape or size to define the pixel regions. The user can also draw a shape (rather than selecting for the available shapes). The shape or size of the pixel region can depend on characteristics of a game application or graphics in the game application. For example, in a game application where the game objects are relatively small, the size of the pixel region may be smaller to detect the differences among two pixel regions. As another example, in a chess game, the shape of a pixel region may be in rectangle shape (to match the shape of the grid on the chess board), while the shape of a pixel region may be in a round or oblong shape in a life simulation game.

In addition to or in alternative to the size and shape of the pixel region, the parameter calculation component 320 can also determine a threshold contrast ratio which can be used by the contrast ratio calculation component 350 to determine whether a pixel region has met the defined contrast ratio. The threshold contrast ratio may be a default contrast ratio. For example, a minimum of 4.5:1 contrast ratio is recommended between foreground and background elements. As another example, when different colored text or icons are used to highlight elements in a game application, the contrast ratio between these colored texts or icons is recommended to be at least 3:1. However, if these colored texts or icons are adjacent to each other, the recommended contrast ratio can be increased to 4.5:1 because it becomes an edge test (where one colored element is compared with another colored element directly next to it).

The threshold contrast ratio can be input by a user via the user interface component of the parameter calculation component 320. For example, a user can input a contrast ratio of 5:1, which is higher than the default contrast ratio of 4.5:1. As will further be described with reference to the data visualization component 360, the pixel region meeting the threshold contrast ratio can be changed to a predefined color to highlight that the pixel region has a sufficient contrast ratio.

The luminance calculation component 340 can calculate the relative luminance of a pixel in the pixel region based on the color of the pixel, where the relative luminance is normalized to 0 for darkest black and 1 for lightest white. The luminance calculation component 340 can use a variety of formulas to calculate luminance of a pixel. As an example, for a standard Red Green Blue (sRGB) color space, the relative luminance of a color can be calculated using formula (1) below.

$$L=0.126*R+0.7152*G+0.0722*B \qquad (1)$$

In formula (1), R, G, and B can be defined as:

$$\text{if } R_{sRGB}<=0.03928 \text{ then } R=R_{sRGB}/12.92 \text{ else}$$
$$R=((R_{sRGB}+0.055)/1.055)^{\wedge}2.4 \qquad (1.1)$$

$$\text{if } G_{sRGB}<=0.03928 \text{ then } G=G_{sRGB}/12.92 \text{ else}$$
$$G=((G_{sRGB}+0.055)/1.055)^{\wedge}2.4 \qquad (1.2)$$

$$\text{if } B_{sRGB}<=0.03928 \text{ then } B=B_{sRGB}/12.92 \text{ else}$$
$$B=((B_{sRGB}+0.055)/1.055)^{\wedge}2.4 \qquad (1.3)$$

and $R_{sRGB}$, $G_{sRGB}$, and $B_{sRGB}$ can be defined as:

$$R_{sRGB}=R_{8bit}/255 \qquad (1.1.1)$$

$$G_{sRGB}=G_{8bit}/255 \qquad (1.2.1)$$

$$B_{sRGB}=B_{8bit}/255 \qquad (1.3.1)$$

The luminance calculation component 340 can calculate the relative luminance for each pixel in the pixel region. For each pixel region, the luminance calculation component 340 can select a pixel which has the highest luminance and another pixel which the lowest luminance. The contrast ratio calculation component 350 can use the pixel having the highest luminance and the pixel having the lowest luminance to calculate a contrast ratio for the pixel region. The contrast ratio for the pixel region may be calculated using the example formula (2) below:

$$\text{Contrast Ratio} = (L_h(R_h, G_h, B_h) + 0.05)/(L_l(R_l, G_l, B_l) + 0.05) \quad (2)$$

where $L_h$ ($R_h$, $G_h$, $B_h$) is the relative luminance for the pixel having the highest luminance in a pixel region and $L_l$ ($R_l$, $G_l$, $B_l$) of the pixel having the lowest luminance in the pixel region. The contrast ratio may be in the range of 1-16, where the number 16 is found from a comparison between the darkest black and brightest white and where the number 1 is found when the two colors are the same.

The contrast ratio calculation component 350 can also compare the contrast ratio of a pixel region (as calculated by the contrast ratio calculation component 350) with a threshold contrast ratio (as determined by the parameter calculation component 320). If the calculated contrast ratio exceeds the threshold contrast ratio, for example, the contrast ratio calculation component 350 can find that the pixel region has a sufficiently high contrast ratio.

The data visualization component 360 can provide a visual indication showing that the contrast ratio exceeds the threshold contrast ratio. The data visualization component 360 can cause pixels in a pixel region to change color from original colors to a predefined color. The predefined color may be set by a game developer or automatically determined based on the game application. For example, the data visualization component 360 can pick a color that is not used in the game application or the frame whose contrast ratio is being analyzed. As one example, a pixel region may include pixels in black color and pixels in white color and a predefined color may be magenta. The data visualization component 360 can change the pixels in black color and pixels in white color to magenta if the contrast ratio of the pixel region is greater than the threshold contrast ratio. In some embodiments, the contrast ratio processing system 122 can continuously detect contrast ratio as the game application is executing. Accordingly, the pixel regions that are changed to the predefined color can also change from one scene to the next.

Although in this example, the visual indication is illustrated as color change of the whole pixel region, in certain implementations, the data visualization component 360 may use other types of visual indications to show that the contrast ratio of a pixel region is sufficient. For example, the visual indication can be an outline of the pixel region. Where the pixel region is a square, the data visualization component 360 can change the color of the pixels along the perimeters of the square to show that the contrast ratio of the pixel region is met.

Figure 4:
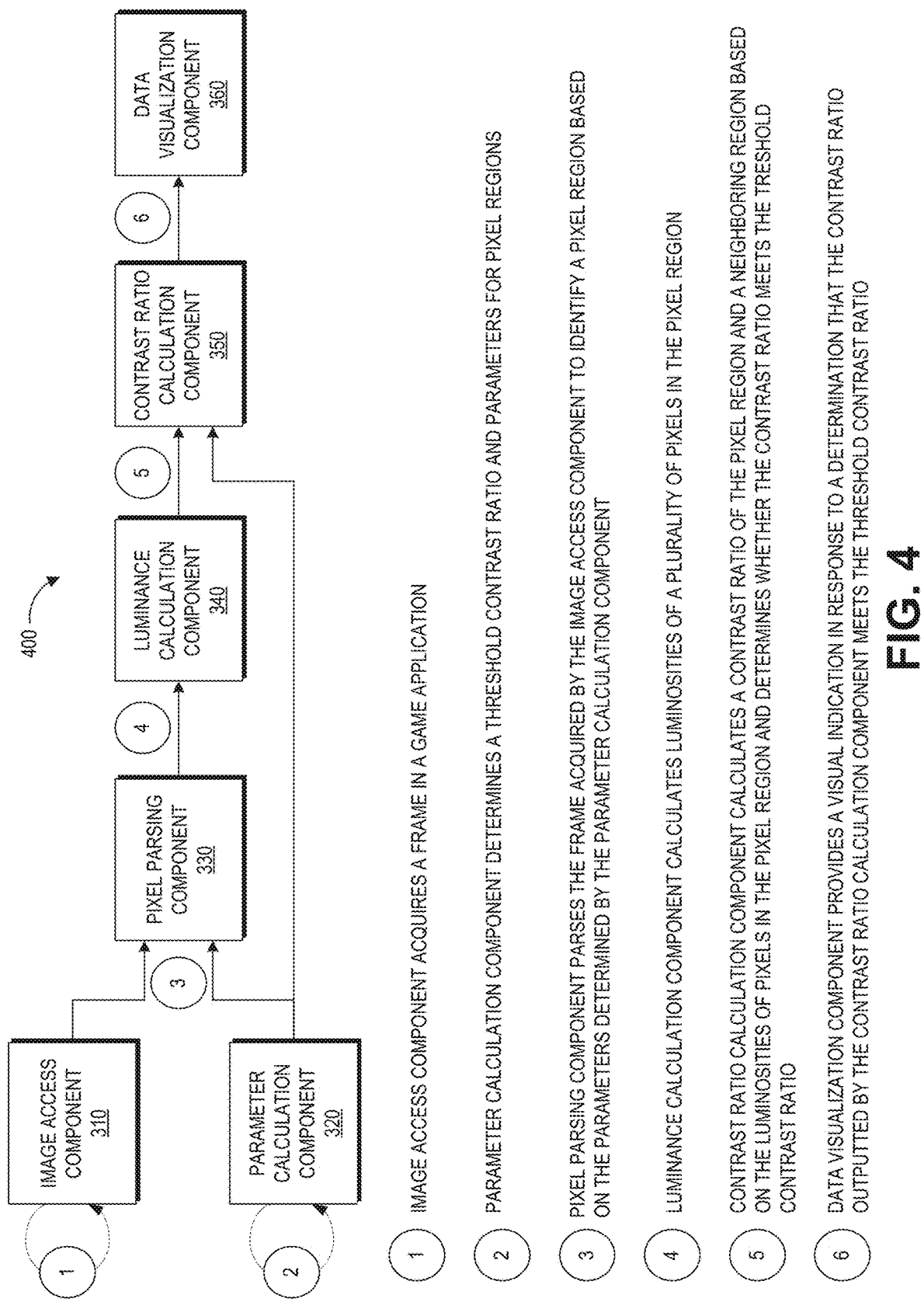
FIG. 4 illustrates an example flow among various components of a contrast ratio processing system for calculating a contrast ratio of a frame in a game application.

FIG. 4 illustrates an example flow among various components of a contrast ratio processing system for calculating a contrast ratio of a frame in a game application. The example flow 400 shows the data flows among the image access component 310, the parameter calculation component 320, the pixel parsing component 330, the luminance calculation component 340, the contrast ratio calculation component 350, and the data visualization component 360. One or more of these components can be part of the contrast ratio processing system 122 shown in FIG. 3.

At (1), the image access component 310 can acquire a frame in a game application 120. The frame can be acquired from the rendered graphics of the game application 120. For example, the image access component 310 can take a screenshot of the game application 120. The image access component 310 can also acquire the frame during runtime of the game application 120, such that the contrast ratio of the frames can be analyzed while the game application 120 is executing. The frame may be a still image or a video frame.

At (2), the parameter calculation component 320 can determine a threshold contrast ratio and parameters for pixel region. The parameters can include a size and a shape of the pixel region. The threshold contrast ratio and the parameters for the pixel region can be specified by a user of the contrast ratio processing system 122. The threshold contrast ratio and parameters can vary depending on the graphics of a game application. For example, the threshold contrast ratio may be 4.5:1 where the comparison is between foreground and background while the threshold contrast ratio may be 3:1 where the lower contrast is needed (e.g., because the font is bigger). In some embodiments, the parameter calculation component 320 can provide a default contrast ratio (such as for example 4.5:1) and can allow a user to set a threshold contrast ratio by varying the default contrast ratio. The parameter calculation component 320 can also provide a default size or shape of a pixel region and provide user interface capabilities for a user to change the size or shape of the pixel region.

At (3), the pixel parsing component 330 can parse the frame acquired by the image access component 310 and use parameters determined by the parameter calculation component 320 to identify a plurality of pixel regions in the frame. For example, the pixel parsing component 330 can determine the boundary of a pixel region based on the size and shape determined by the parameter calculation component 320. Each pixel region can include at least two pixels to facilitate calculation of the contrast ratio. In some situations where image jittering occurs, a certain number of neighboring pixels may be ignored in forming a pixel region. Additionally or alternatively, the size of the pixel region may also increase to account for jittering.

At (4), the luminance calculation component 340 can calculate luminance of pixels in the respective pixel regions. For a pixel region, the luminance calculation component 340 can calculate luminance of each pixel in a pixel region based on the color of the pixel and output the luminance for the pixels to the contrast ratio calculation component 360.

At (5), the contrast ratio calculation component 350 can calculate contrast ratios for a pixel region. For each pixel region, the contrast ratio calculation component 350 can access luminance calculated for pixels in the pixel region and identify the highest luminance value and lowest luminance value in the pixel region. The contrast ratio calculation component 350 can calculate the contrast ratio for the pixel region using the highest luminance value and the lowest luminance value. The contrast ratio calculation component 350 can compare the threshold contrast ratio identified by the parameter calculation component 320 with the contrast ratio of the pixel region. The contrast ratio calculation component 350 can output the results of the comparison to the data visualization component 360.

At (6), the data visualization component 360 can provide a visual indication in response to a determination that the contrast ratio outputted by the contrast ratio calculation component meets the threshold contrast ratio. For example, the data visualization component 360 can change the color of a pixel region that has a contrast ratio greater than or equal to the threshold contrast ratio. In some embodiments, in addition to or in alternative to providing a visual indication where the contrast ratio meets the threshold contrast ratio, the data visualization component 360 can provide a visual indication where the contrast ratio of a pixel region does not meet the threshold contrast ratio.

As described with reference to FIG. 3, the frame can also be analyzed during runtime of the game application. The contrast ratio processing system 122 can perform (1) through (6) (or a subset of them) as part of the post-processing step for the frame. The frame as rendered on a display screen of the computing system 110 can accordingly include the visual indication as provided in (6).

Example Applications of a Contrast Ratio Processing System

Figure 5A:
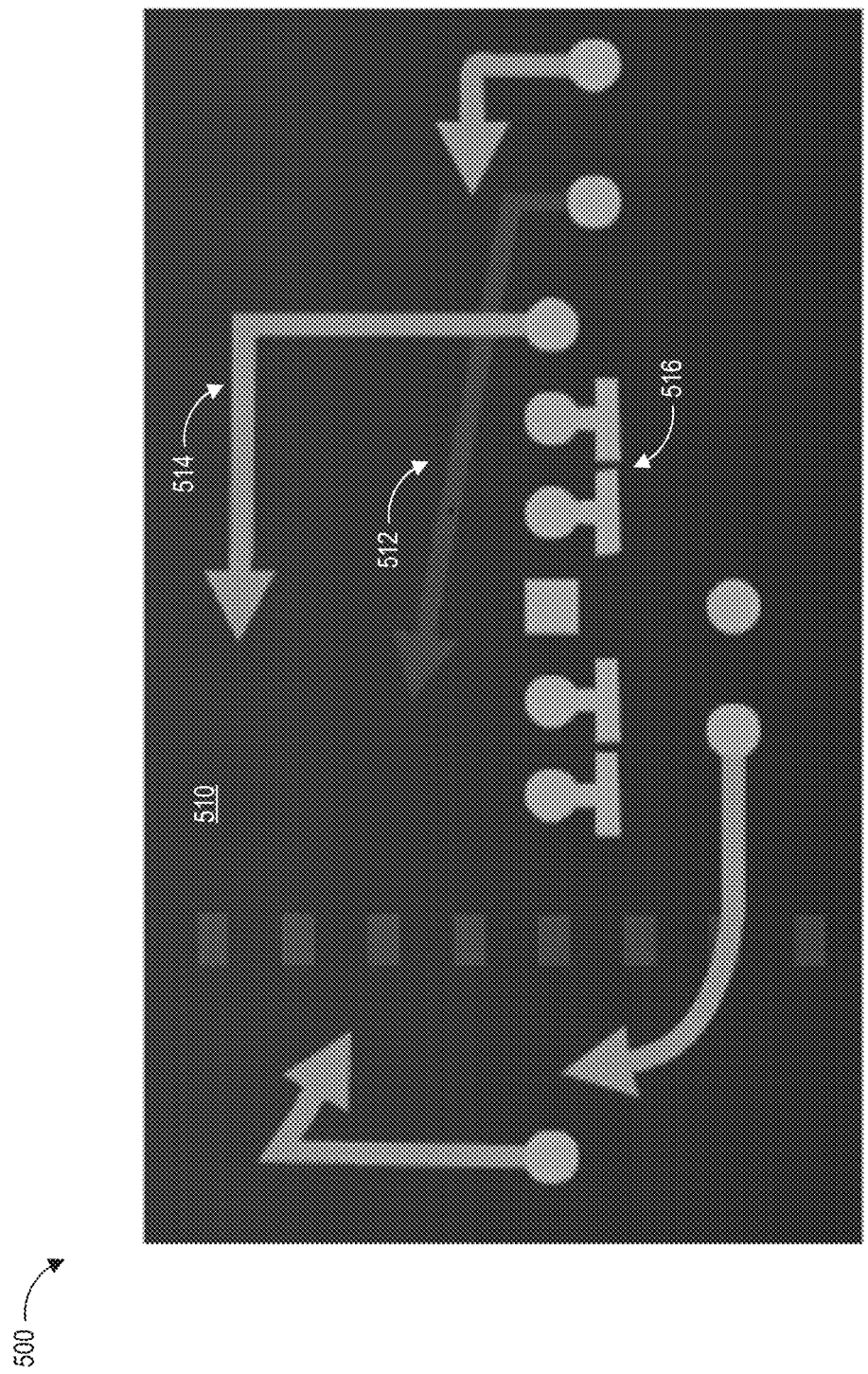
FIGS. 5A and 5B illustrate example applications of a contrast ratio processing system.
Figure 5B:
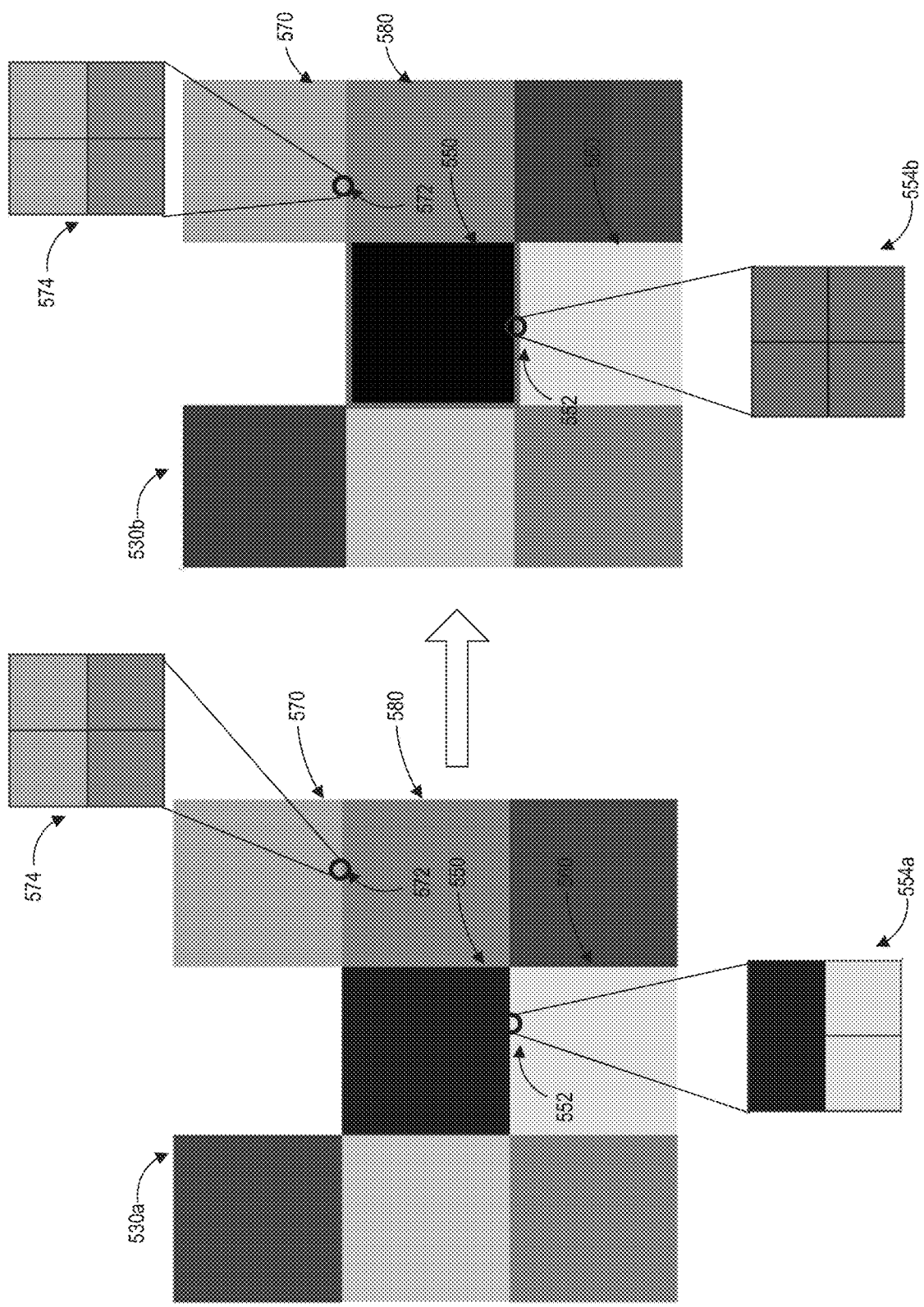

FIGS. 5A and 5B illustrate example applications of a contrast ratio processing system. FIG. 5A illustrates example contrast ratios among elements in a frame 500. The frame 500 shows, among other things, a blue background 510, one red arrow 512, one gold arrow 514, and a series of gray elements 516. Assuming that the threshold contrast ratio is a 4.5, the red arrow 512 fails this threshold contrast ratio because the contrast ratio between the red arrow 512 and the blue background 510 is 1.59, The brightness of the red arrow 512 will need to increase in order to meet the threshold contrast ratio. The gold arrow 514 is brighter than the red arrow 512. However, the contrast ratio between the gold arrow and the background 510 is only 4.1, which still does not meet the threshold contrast ratio. The contrast ratio between the gray elements and the blue background 510 is 4.81 and thus meets the threshold contrast ratio.

FIG. 5B illustrates an example of automatically detecting contrast ratios in a frame and providing a visual indication of the pixel regions which meets a threshold contrast ratio. There are two image frames 530a and 530b illustrated in FIG. 5B. The image frame 530a illustrates a frame in a game application before the frame is processed by the contrast ratio processing system 122. The image frame 530b shows a rendered frame having visual indications of pixel regions where the contrast ratio meets a threshold contrast ratio.

The frames 530a and 530b includes a variety of gray, white, and black rectangles. The contrast ratio processing system 122 can divide the frame into multiple pixel regions, such as, for example, the pixel regions 552 and 572. The pixel regions 552 and 572 each have four pixels, as shown in the blow-up views 554a, 554b, and 574. Each pixel is schematically illustrated as a square shape even though the actual shape of the pixel can be different. The pixel region 552 includes pixels from the block 550 and the block 560. For example, the top two pixels in the pixel region 552 may come from the block 550 while the bottom two pixels may come from the block 560. The pixel region 572 includes pixels from the block 570 and the block 580. For example, the top two pixels in the pixel region 572 may come from the block 570 while the bottom two pixels may come from the block 580.

As described herein, the contrast ratio processing system 122 can calculate a contrast ratio for each pixel region using the highest luminance and the lowest luminance in the pixel region. The contrast ratio processing system 122 can perform such calculation on the image frame 530a. With reference to the pixel region 552, the highest luminance can be derived from a pixel having the color in block 560 while the lowest luminance can be derived from a pixel having the color in the block 550. With reference to the pixel region 572, the highest luminance can be derived from a pixel having the color in block 570 while the lowest luminance can be derived from a pixel having the color in the block 580.

The contrast ratio for each pixel region can be compared with a threshold contrast ratio. In this example, the contrast ratio for the pixel region 552 meets the threshold contrast ratio while the contrast ratio for the pixel region 572 does not meet the threshold contrast ratio.

The contrast ratio processing system 122 can change the color of a pixel region from its original colors in the frame 530a to a predefined color and output a frame (e.g., the frame 530b) with the color change. The update frame can be rendered on a display of the computing system 110. In this example, the predefined color is magenta. As shown in the blow-up views 554a and 554b, the color of top two pixels in the pixel region 552 is changed from black (shown in the view 554a) to magenta (shown in the view 554b) and the color of the bottom two pixels in the pixel region 552 is changed from light gray (shown in the view 554a) to magenta (shown in the view 554b). The color of the pixel region 572, however, does not change between the image frames 530a and 530b because the contrast ratio of pixel region 572 does not meet the threshold contrast ratio. Accordingly, as illustrated in the blow-up view 574, the color of the top two pixels in the pixel region 572 remains the same as the color of the block 570 while the color of the bottom two pixels in the pixel region 572 is the same as the color of the block 580.

As shown in FIG. 5B some of the pixel regions that meet the threshold contrast ratio are neighboring pixel regions. As a result, there appears to be continuous magenta lines in FIG. 5B. However, if the size of the pixel region is relatively large, the magenta lines may become broken lines (rather than continuous lines).

Example Processes of Calculating a Contrast Ratio of A Frame

Figure 6:
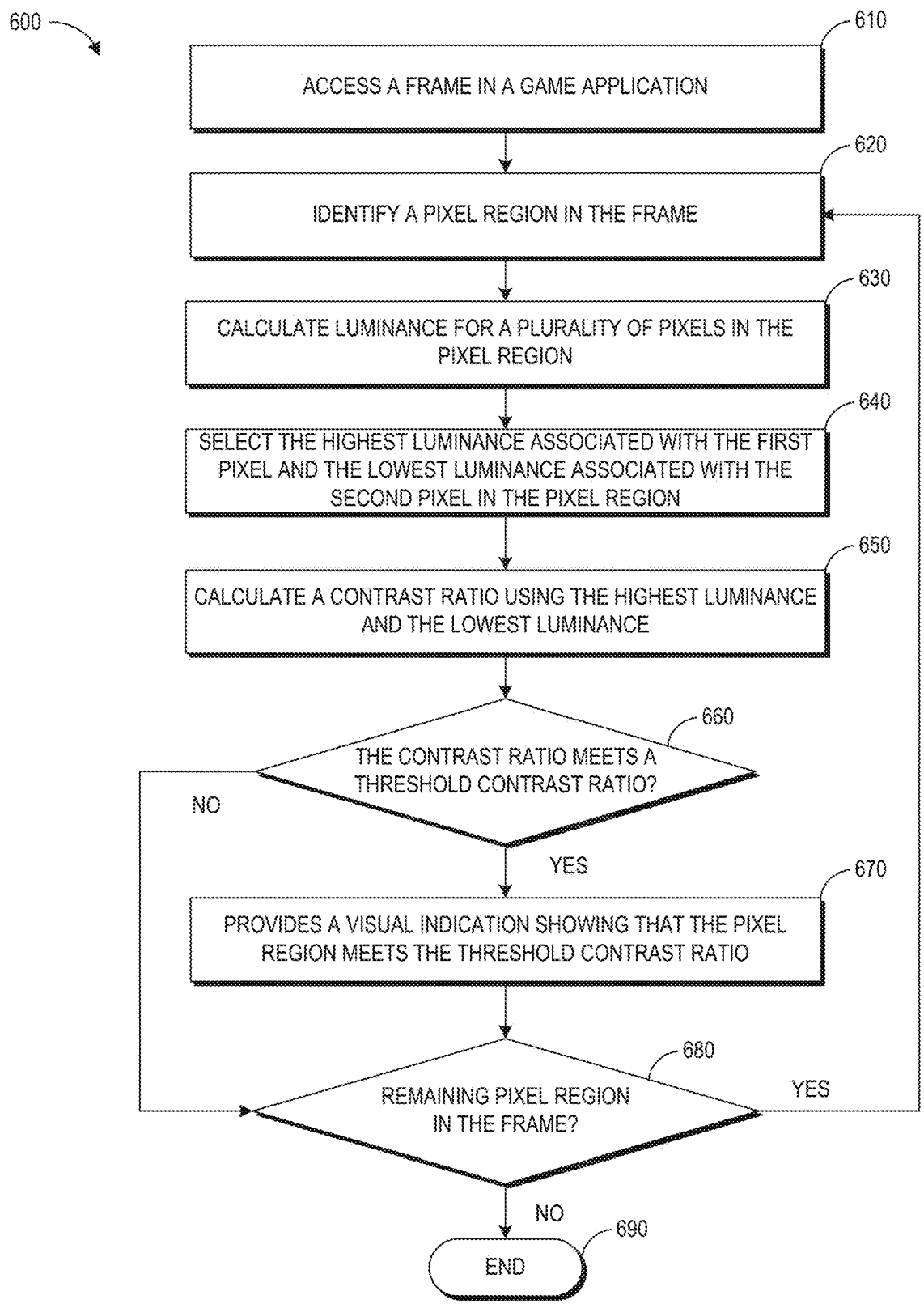
FIG. 6 illustrates an example process of calculating a contrast ratio of a frame in a game application.

FIG. 6 illustrates an example process of calculating a contrast ratio of a frame in a game application. The example process can be performed by the contrast ratio processing system 122 shown in FIG. 1. The contrast ratio processing system 122 may be part of the game engine 124 or the game application 120 as a debug tool such that a user can access the contrast processing system 122 during the runtime of the game application 120. The contrast ratio processing system 122 can also be a standalone application which is outside of the game engine 124 or the game application 120. In certain embodiments, the contrast ratio processing system 122 can also be part of the game editor 126 which can perform analysis on game graphics before the game is finalized.

At block 610, the contrast ratio processing system can access a frame in a game application. The frame may be a portion of the rendered graphics of the game application. The contrast ratio processing system can access the frame by taking a screenshot of the game application. In some embodiments, the frames of the game application may be previously recorded and stored in a data store. The contrast ratio processing system can accordingly access a frame from the data store.

At block 620, the contrast ratio processing system can identify a pixel region in the frame. The contrast ratio processing system can divide the frame into a plurality of pixel regions having a certain shape or size. A pixel region can include at least two pixels inside.

At block 630, the contrast ratio processing system can calculate luminance for a plurality of pixels in the pixel region. For example, the contrast ratio processing system can apply formula (1) (described with reference to FIG. 3) to each pixel in the pixel region to calculate the luminance for that pixel.

At block 640, the contrast ratio processing system can select the highest luminance value and the lowest luminance value in the pixel region and calculate a contrast ratio for the pixel region using the highest luminance and lowest luminance at block 650.

select a first pixel having the highest luminance and a second pixel having the lowest luminance and. In some implementations, the contrast ratio processing system can also identify which pixel has the highest luminance and which pixel has the lowest luminance in a pixel region. The contrast ratio can be calculated using the formula (2) as described with reference to FIG. 3.

At block 660, the contrast ratio processing system can determine whether the contrast ratio calculated for a pixel region meets a threshold contrast ratio. The threshold contrast ratio may be a user defined value or may be a value determined by the contrast ratio processing system (such as, for example, a default value or a value automatically determined based on characteristics of the game application).

If the contrast ratio meets the threshold contrast ratio, at block 670, the contrast ratio processing system can provide a visual indication showing that the pixel region meets the threshold contrast ratio. For example, the contrast ratio processing system can update the colors of the pixels in the pixel region to a predefined color. The predefined color may be a color that has not been used (or has rarely been used) in the frame or the game application.

If the contrast ratio does not meet the threshold contrast ratio, the contrast ratio processing system may not provide a visual indication and the contrast ratio processing system can move to block 680 where the contrast ratio processing system can determine whether there are other pixel regions in the frame whose contrast ratios have not yet been calculated. If the contrast ratios for all pixel regions have been calculated, the process 600 ends at block 690. Otherwise, the blocks 610-670 can be performed again on the remaining pixel regions.

Although the examples of the contrast ratio processing system in this disclosure are described with reference to a video game application, the contrast ratio processing system can also be applicable in other types of application such as a movie, educational software, or other types of application having visual graphics.

Example Implementation

The examples below contain non-limiting examples of implementations of the functions described herein. Example 1 below illustrates an embodiment of some example routines for calculating luminance of pixels in a pixel region, calculating a contrast ratio of the pixel region, comparing the calculated contrast ratio with a threshold contrast ratio, and changing the color of the pixel region if the calculated contrast ratio meets the threshold contrast ratio as described above. The routines in Example 1 can be part of the contrast ratio processing system 122.

Example 1

```
float CalcLumComponent(float channel)
{
    float isLarge=clamp(1.0+floor(channel−0.03928),0.0, 1.0);
    return    (1.0−isLarge)*channel/12.92+isLarge*(pow ((channel+0.55)/1.0555,2.4));
}
float CalcLum(vec3 color)
{
    float lum=CalcLumComponent(color.r)*0.2126;
    lura+=CalcLumComponent(color.g)*0.752;
    lura+=CalcLumComponent(color.b)*0.0722;
    return lum;
}
vec3 RatioBox(vec2 uv, vec3 color, float ratio, float thickness)
{
    float lum1=CalcLum(texture2D(iChannel0, uv+vec2(−1.0*thickness/iResolution.x, −1.0*thickness/iResolution.y)).rgb);
    float lum2=CalcLum(texture2D(iChannel0, uv+vec2(thickness/iResolution.x, thickness/iResolution.y)).rgb);
    float lum3=CalcLum(texture2D(iChannel0, uv+vec2(−1.0*thickness/iResolution.x, thickness/iResolution.y)).rgb);
    float lum4=CalcLum(texture2D(iChannel0, uv+vec2(thickness/iResolution.x, −1.0*thickness/iResolution.y)).rgb);
    float lum5=CalcLum(texture2D(iChannel0, uv+vec2(0.0/iResolution.x, −1.0*thickness/iResolution.y)).rgb);
    float lum6=CalcLum(texture2D(iChannel0, uv+vec2(0.0/iResolution.x, thickness/iResolution.y)).rgb);
    float lum7=CalcLum(texture2D(iChannel0, uv+vec2(0.0/iResolution.x,0.0/iResolution.y)).rgb);
    float lum8=CalcLum(texture2D(iChannel0, uv+vec2(−1.0*thickness/iResolution.x, 0.0/iResolution.y)).rgb);
    float lum9=CalcLum(texture2D(iChannel0, uv+vec2(thickness/iResolution.x, 0.0/iResolution.y)).rgb);
    float     minlum=min(lum9,min(min(min(lum1,lum2), min(lum3,lum4)),min(lum5,lum6),    min(lum7, lum8))));
    float maxlum=max(lum9,max(max(max(lum1,lum2), max(lum3,lum4)),max(lum5,lum6),    max(lum7, lum8))));
    float    isContrast=clamp(floor((((maxlum+0.05)/ (minlum+0.05))−ratio; 1.0,0.0)+1.0;
    color=color*(1.0−isContrast)+vec3(1.0,0.0,1.0)* isContrast;
    return color;
}
void mainImage(out vec4 fragColor, in vec2 fragCoord)
{
    vec2 uv=fragCoord.xy/iResoiution.xy;
    vec3 color=texture2D(iChannel0,uv).rgb;
    color.rgb=RatioBox(uv, color, CONTRAST_RATIO, 2.0);
    fragColor=vec4(color.rgb, 1.0);
}
```

Overview of Computing Device

Figure 7:
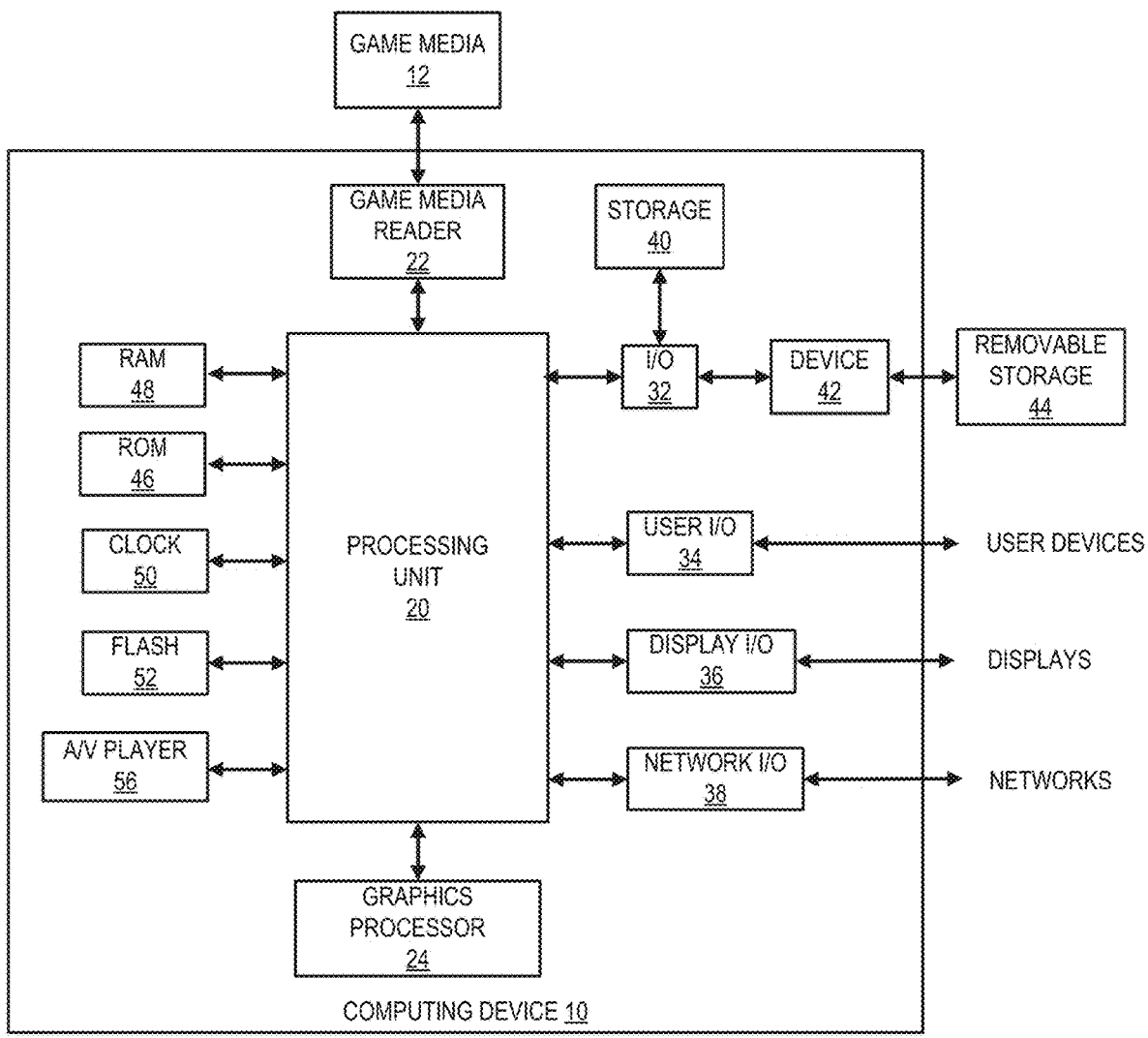
FIG. 7 illustrates an embodiment of a computing device.

FIG. 7 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively or additionally, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a video game is being played.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online, application of fraud detection, and/or generation of a fraud detection model.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a video game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
    at least one hardware processor configured to render graphics of a game application, wherein computer-readable instructions cause the at least one hardware processor to:
    render a plurality of frames per second during runtime of the game application, wherein each frame comprises a plurality of game elements within a game environment;
    for each of the plurality of frames, before outputting the frame within the game application,
        divide the entire frame into a plurality of pixel regions, wherein each pixel region comprises a plurality of pixels that is a subset of a total number of pixels in the frame;
        for each pixel region of the plurality of pixel regions, each pixel region including one or more game elements of the plurality of game elements,
            calculate a luminance for two or more pixels of the plurality of pixels in the pixel region;
            select a highest luminance value associated with a first pixel in the pixel region and a lowest luminance value associated with a second pixel in the pixel region;
            calculate a contrast ratio for the pixel region using the highest luminance value and the lowest luminance value;
            automatically determine a threshold contrast ratio based on one or more game elements included within the pixel region and a light condition in the game environment;
            determine whether the contrast ratio meets the determined threshold contrast ratio; and
            provide a visual indication in the pixel region in response to a determination that the pixel region meets the threshold contrast ratio, wherein the visual indication is a change of color of each of the plurality of pixels in the pixel region to a predefined color such that each of the plurality of pixels in the pixel region is changed to the same color;
        generate an updated frame comprising the plurality of pixel regions, wherein a subset of the plurality of pixel regions display the visual indication; and
        output the updated frame for display in the game application.

2. The system of claim 1, wherein the predefined color comprises a color that is not used in the frame.

3. The system of claim 1, wherein the frame comprises at least one of a still image or a frame in a video associated with the game application.

4. The system of claim 1, wherein to determine a pixel region in the frame, the computer-readable instructions cause the at least one hardware processor to access a size and a shape of the pixel region; and delineate a boundary of the pixel region based on the size and the shape of the pixel region.

5. The system of claim 1, wherein the light condition is the use of high dynamic range lighting to render the game environment.

6. The system of claim 1, wherein the threshold contrast ratio comprises a ratio within a range of 7:1 to 3:1.

7. The system of claim 1, wherein the game elements comprise textual game elements and graphical game elements.

8. The system of claim 7, wherein the computer-readable instructions cause the at least one hardware processor to the use a first threshold contrast ratio of a plurality of threshold contrast ratios for comparing textual and graphical game elements when automatically determining the threshold contrast ratio.

9. The system of claim 8, wherein the computer-readable instructions cause the at least one hardware processor to the use a second threshold contrast ratio of the plurality of threshold contrast ratios for comparing different graphical elements when automatically determining the threshold contrast ratio.

10. The system of claim 7, wherein the computer-readable instructions cause the at least one hardware processor to automatically determine the threshold contrast ratio based at least in part on a size of textual elements.

11. The system of claim 1, wherein the computer-readable instructions cause the at least one hardware processor to exclude from the pixel regions to account for jittering.

12. A computer-implemented method for automatically detecting a contrast ratio in a rendered frame, the computer-implemented method comprising:
rendering a plurality of frames per second during runtime of a game application, wherein each frame comprises a plurality of game elements within a game environment;
for each of the plurality of frames, before outputting the frame within the game application,
dividing the entire frame into a plurality of pixel regions, wherein each pixel region comprises a plurality of pixels that is a subset of a total number of pixels in the frame;
for each pixel region of the plurality of pixel regions, each pixel region including one or more game elements of the plurality of game elements,
calculating a luminance for two or more pixels of the plurality of pixels in the pixel region;
selecting a highest luminance value associated with a first pixel in the pixel region and a lowest luminance value associated with a second pixel in the pixel region;
calculating a contrast ratio for the pixel region using the highest luminance value and the lowest luminance value;
automatically determining a threshold contrast ratio based on the one or more game elements included within the pixel region and a light condition in the game environment;
determining whether the contrast ratio meets the determined threshold contrast ratio; and
providing a visual indication in the pixel region in response to a determination that the pixel region meets the threshold contrast ratio, wherein the visual indication is a change of color of each of the plurality of pixels in the pixel region to a predefined color such that each of the plurality of pixels in the pixel region is changed to the same color;
generating an updated frame comprising the plurality of pixel regions, wherein a subset of the plurality of pixel regions display the visual indication; and
outputting the updated frame for display in the game application.

13. The computer-implemented method of claim 12, wherein the predefined color comprises a color that is not used in the frame.

14. The computer-implemented method of claim 12, wherein the frame comprises at least one of: a still image or a frame in a video associated with the game application.

15. The computer-implemented method of claim 12, wherein determining a pixel region in the frame comprises accessing a size and a shape of the pixel region and delineating a boundary of the pixel region based on the size and the shape of the pixel region.

16. The computer-implemented method of claim 12, wherein the light condition is the use of high dynamic range lighting to render the game environment.

17. A non-transitory computer readable medium storing software instructions thereon for automatically detecting a contrast ratio in a rendered frame, the software instructions cause a computer system to:
render a plurality of frames per second during runtime of the game application, wherein each frame comprises a plurality of game elements within a game environment;
for each of the plurality of frames, before outputting the frame within the game application,
divide the entire frame into a plurality of pixel regions, wherein each pixel region comprises a plurality of pixels that is a subset of a total number of pixels in the frame;
for each pixel region of the plurality of pixel regions, each pixel region including one or more game elements of the plurality of game elements,
calculate a luminance for two or more pixels of the plurality of pixels in the pixel region;
select a highest luminance value associated with a first pixel in the pixel region and a lowest luminance value associated with a second pixel in the pixel region;
calculate a contrast ratio for the pixel region using the highest luminance value and the lowest luminance value;
automatically determine a threshold contrast ratio based on the one or more game elements included within the pixel region and a light condition in the game environment;
determine whether the contrast ratio meets the determined threshold contrast ratio; and
provide a visual indication in the pixel region in response to a determination that the pixel region meets the threshold contrast ratio, wherein the visual indication is a change of color of each of the plurality of pixels in the pixel region to a predefined color such that each of the plurality of pixels in the pixel region is changed to the same color;
generate an updated frame comprising the plurality of pixel regions, wherein a subset of the plurality of pixel regions display the visual indication; and
output the updated frame for display in the game application.

18. The non-transitory computer readable medium of claim 17, wherein the predefined color comprises a color that is not used in the frame.

19. The non-transitory computer readable medium of claim 17, wherein to determine a pixel region in the frame, the software instructions cause the computer system to access a size and a shape of the pixel region; and delineate a boundary of the pixel region based on the size and the shape of the pixel region.

20. The non-transitory computer readable medium of claim 17, wherein the light condition is whether the game environment is rendered using high dynamic range lighting.

* * * * *